United States Patent
Santoso et al.

(10) Patent No.: US 8,863,505 B2
(45) Date of Patent: Oct. 21, 2014

(54) START-STOP HYBRID EXOTHERMIC CATALYST HEATING SYSTEM

(75) Inventors: Halim G. Santoso, Novi, MI (US); Eugene V. Gonze, Pinckney, MI (US); Bryan Nathaniel Roos, Novi, MI (US); Brian L. Spohn, Holly, MI (US)

(73) Assignee: GM Global Technology Operations LLC

( * ) Notice: Subject to any disclaimer, the term of this patent is extended or adjusted under 35 U.S.C. 154(b) by 433 days.

(21) Appl. No.: 12/767,179

(22) Filed: Apr. 26, 2010

(65) Prior Publication Data
US 2011/0258984 A1 Oct. 27, 2011

(51) Int. Cl.
*F01N 3/00* (2006.01)
*F01N 3/10* (2006.01)
*F01N 3/20* (2006.01)
*F01N 3/22* (2006.01)

(52) U.S. Cl.
CPC ............ *F01N 3/2013* (2013.01); *F01N 3/2006* (2013.01); *F01N 3/22* (2013.01); *Y02T 10/26* (2013.01); *F01N 2550/14* (2013.01)
USPC ................... 60/300; 60/286; 60/274; 60/299; 60/303

(58) Field of Classification Search
CPC ... Y02T 10/26; F01N 2550/14; F01N 3/2006; F01N 3/2013; F01N 3/22
USPC ........... 60/285, 299, 289, 300, 277, 286, 295, 60/297, 303
See application file for complete search history.

(56) References Cited

U.S. PATENT DOCUMENTS

| | | | | |
|---|---|---|---|---|
| 5,224,335 A | * | 7/1993 | Yoshizaki | 60/300 |
| 5,271,906 A | * | 12/1993 | Yuuki et al. | 422/177 |
| 5,385,017 A | * | 1/1995 | Harada | 60/284 |
| 5,390,488 A | * | 2/1995 | Ament et al. | 60/274 |
| 5,410,875 A | * | 5/1995 | Tanaka et al. | 60/288 |
| 5,444,976 A | * | 8/1995 | Gonze et al. | 60/274 |
| 5,493,857 A | * | 2/1996 | Komatsuda et al. | 60/284 |
| 5,555,725 A | * | 9/1996 | Shimasaki et al. | 60/277 |
| 5,577,383 A | * | 11/1996 | Kuroda et al. | 60/284 |
| 5,582,805 A | * | 12/1996 | Yoshizaki et al. | 422/174 |
| 5,634,331 A | * | 6/1997 | Aoki et al. | 60/284 |
| 5,782,087 A | * | 7/1998 | Kinugasa et al. | 60/276 |
| 5,848,530 A | * | 12/1998 | Matsuoka et al. | 60/277 |
| 5,956,947 A | * | 9/1999 | Tanaka et al. | 60/297 |

(Continued)

OTHER PUBLICATIONS

Office Action dated Oct. 30, 2012 from German Patent Office for German Patent Application No. DE102011018293.4.

*Primary Examiner* — Thomas Denion
*Assistant Examiner* — Anthony Ayala Delgado

(57) ABSTRACT

A catalyst heating system includes a first monitoring module, a mode selection module and an electrically heated catalyst (EHC) control module. The first monitoring module monitors at least one of (i) a first temperature of a first catalyst of a catalyst assembly in an exhaust system of an engine and (ii) an active catalyst volume of the catalyst assembly. The mode selection module is configured to select an EHC heating mode and at least one of a fuel enrichment mode and a secondary air injection mode based on the at least one of the first temperature and the active catalyst volume. The EHC control module controls current to one of the first catalyst and a second catalyst of the catalyst assembly based on the mode signal.

19 Claims, 4 Drawing Sheets

(56) References Cited

U.S. PATENT DOCUMENTS

| | | | |
|---|---|---|---|
| 5,966,931 A * | 10/1999 | Yoshizaki et al. | 60/284 |
| 6,205,776 B1 * | 3/2001 | Otsuka | 60/285 |
| 6,829,888 B2 * | 12/2004 | Kuenstler et al. | 60/284 |
| 6,865,883 B2 * | 3/2005 | Gomulka | 60/295 |
| 2002/0078683 A1 * | 6/2002 | Katayama et al. | 60/285 |
| 2004/0083716 A1 * | 5/2004 | Twigg | 60/284 |
| 2009/0025371 A1 | 1/2009 | Hermansson et al. | |
| 2009/0301437 A1 * | 12/2009 | Mizoguchi et al. | 123/443 |

* cited by examiner

START-STOP HYBRID EXOTHERMIC CATALYST HEATING SYSTEM

FIELD

The present disclosure relates to catalytic converters of an exhaust system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Catalytic converters are used in an exhaust system of an internal combustion engine (ICE) to reduce emissions. As an example, a three-way catalyst converter (TWC) reduces nitrogen oxide, carbon monoxide and hydrocarbons within an exhaust system. The three-way converter converts nitrogen oxide to nitrogen and oxygen, carbon monoxide to carbon dioxide and oxidizes unburnt hydrocarbons to produce carbon dioxide and water.

An average light off temperature at which a catalytic converter typically begins to function is approximately 200-350° C. As a result, a catalytic converter does not function or provides minimal emission reduction during a warm up period that occurs upon a cold start up of an engine. Operating temperatures of a catalytic converter may be approximately 650-900° C. after the warm up period. Efficiency of a catalytic converter improves with an increase in operating temperature. For the stated reasons, the quicker a catalytic converter increases to the light off temperature upon a cold start the better the emission reduction performance of an exhaust system.

Hybrid electric vehicles may include an ICE and one or more electric motors. The ICE may have an exhaust system with a catalytic converter. The ICE may be deactivated repeatedly and/or for extended periods of time to conserve fuel. Temperature of the catalytic converter decreases when the ICE is deactivated. A start/stop vehicle includes and deactivates an ICE during, for example ICE idle periods and/or when velocity of the start/stop vehicle is 0 m/s. As a result, a catalytic converter may provide limited emission reduction performance upon starting of a hybrid electric vehicle and a start/stop vehicle.

SUMMARY

In one embodiment, a catalyst heating system is provided and includes a first monitoring module, a mode selection module and an electrically heated catalyst (EHC) control module. The first monitoring module monitors at least one of (i) a first temperature of a first catalyst of a catalyst assembly in an exhaust system of an engine and (ii) an active catalyst volume of the catalyst assembly. The mode selection module is configured to select an EHC heating mode and at least one of a fuel enrichment mode and a secondary air injection mode based on the at least one of the first temperature and the active catalyst volume. The EHC control module controls current to one of the first catalyst and a second catalyst of the catalyst assembly based on the mode signal.

In other features, a method of operating a catalyst heating system is provided and includes monitoring at least one of (i) a first temperature of a first catalyst of a catalyst assembly in an exhaust system of an engine and (ii) an active catalyst volume of the catalyst assembly. An electrically heated catalyst (EHC) heating mode and at least one of a fuel enrichment mode and a secondary air injection mode are selected based on the at least one of the first temperature and the active catalyst volume. Current to one of the first catalyst and a second catalyst of the catalyst assembly are controlled based on the mode signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
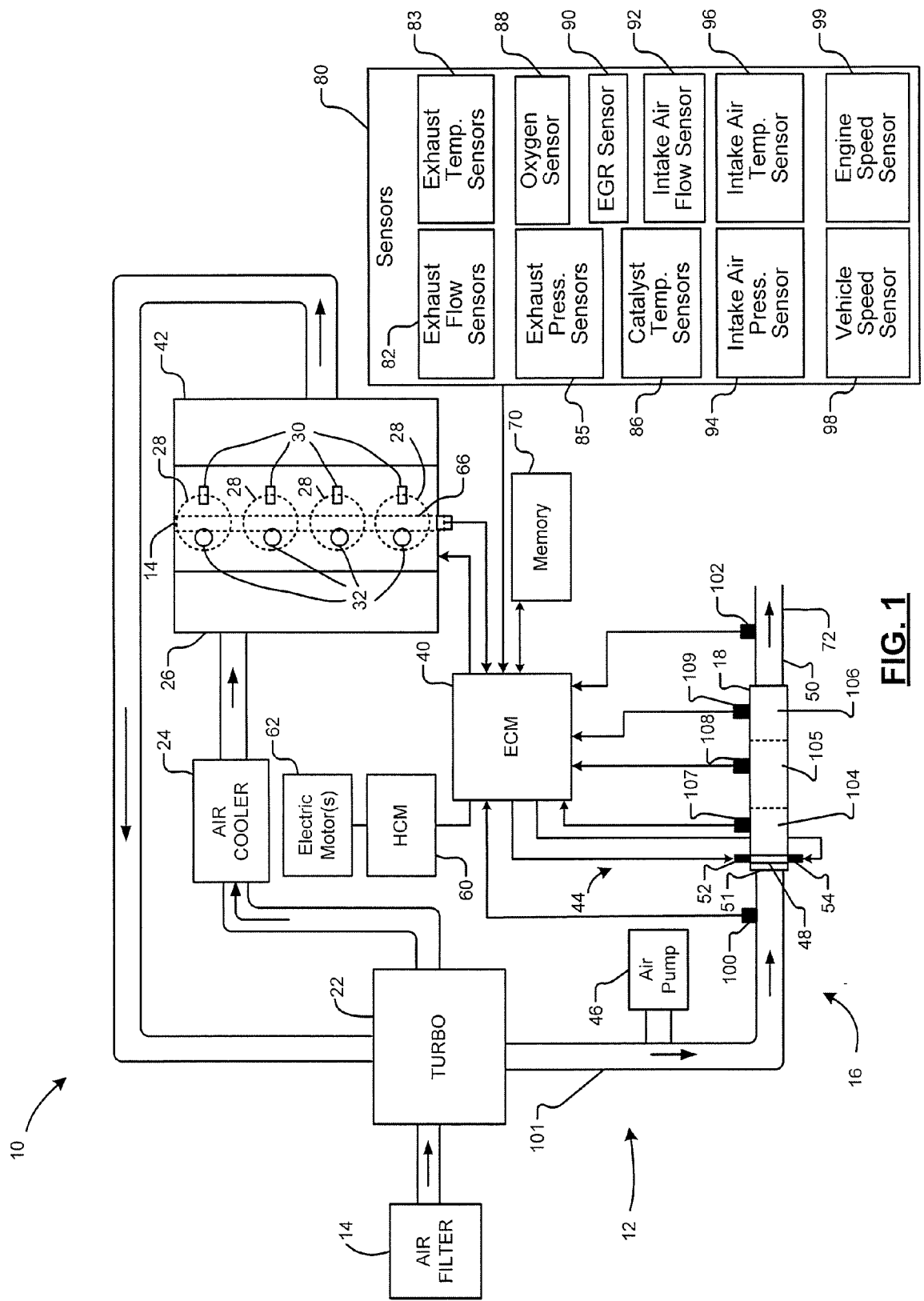
FIG. 1 is a functional block diagram of an exemplary engine system incorporating a catalyst heating system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, and/or a combinational logic circuit.

In FIG. 1, an exemplary engine system 10 that includes a catalyst heating system 12 is shown. The engine system 10 may be a hybrid electric vehicle system, a plug-in hybrid electric vehicle system, a start/stop vehicle system, a super ultra low emissions vehicle (SULEV) system, partial zero emissions vehicle (PZEV) system, etc. The engine system 10 includes an engine 14 with an exhaust system 16. The exhaust system 16 includes a catalytic converter (CC) 18. The catalyst heating system 12 heats catalyst(s) in the CC 18 (catalyst assembly). The catalyst heating system 12 may heat the catalyst(s) after starting of the engine 14. Although the engine system 10 is shown as a spark ignition engine, the engine system 10 is provided as an example. The catalyst heating system 12 may be implemented on various other engine systems, such as diesel engine systems.

The engine system 10 includes the engine 14 that combusts an air and fuel mixture to produce drive torque. Air enters the engine 14 by passing through an air filter 20. Air passes through the air filter 20 and may be drawn into a turbocharger 22. The turbocharger 22 when included compresses the fresh air. The greater the compression, the greater the output of the engine 14. The compressed air passes through an air cooler 24 when included before entering an intake manifold 26.

Air within the intake manifold 26 is distributed into cylinders 28. Fuel is injected into the cylinders 28 by fuel injectors 30, which are part of a fuel injection system. Spark plugs 32 ignite air/fuel mixtures in the cylinders 28. Combustion of the air/fuel mixtures creates exhaust. The exhaust exits the cylinders 28 into the exhaust system 16.

The catalyst heating system 12 includes the exhaust system 16 and an engine control module (ECM) 40. The exhaust system 16 includes the CC 18, the ECM 40, the exhaust manifold 42, a catalyst heating circuit 44, and an air pump 46. As an example, the CC 18 may include a three-way catalyst (TWC). The CC 18 may reduce nitrogen oxides NOx, oxidizes carbon monoxide (CO) and oxidizes unburnt hydrocarbons (HC) and volatile organic compounds. The CC 18 oxidizes the exhaust based on a post combustion air/fuel ratio. The amount of oxidation increases the temperature of the exhaust.

The CC 18 includes an electrically heated catalyst (EHC) 48 and a non-EHC 50. The EHC 48 is actively heated. The non-EHC 50 is passively heated through adjacent heat transfer and/or via fuel enrichment of the engine 14 and secondary air injection (SAI) into the exhaust system 16. The EHC 48 and the non-EHC 50 may refer to different portions of a single catalyst or may be distinct adjacent catalysts. For example only, the EHC 48 may have approximately 20% of the total catalyst mass of the CC 18. The non-EHC 50 may have approximately 70-80% of the total catalyst mass. An additional non-EHC 51 may be adjacent to and upstream from the EHC 48. The EHC 51 may increase in temperature due to adjacent heat transfer from the EHC 48. The EHC 48 receives a selected current and/or a selected voltage from the catalyst heating circuit 44. Electrically heating of the EHC 48 and not the non-EHC 50 allows for quick activation of the EHC 48 for off cycle emission reduction.

The catalyst heating circuit 44 includes one or more terminals. In the example shown, two terminals are provided; a supply terminal 52 and a ground or return terminal 54. In the example shown, the EHC 48 may perform as a resistive element between the terminals 52, 54 and receive current from the supply terminal 52. Temperature of the EHC 48 increases while current is supplied to the supply terminal 52. This allows the EHC 48 to increase to a functioning or active temperature (e.g., ≥a catalyst light off temperature $T_{CLO}$ of 200-400° C.) when the engine 14 is not activated.

Optionally, an EGR valve (not shown) re-circulates a portion of the exhaust back into the intake manifold 26. The remainder of the exhaust is directed into the turbocharger 22 to drive a turbine. The turbine facilitates the compression of the fresh air received from the air filter 20. Exhaust flows from the turbocharger 22 to the CC 18.

The engine system 10 may also include a hybrid control module (HCM) 60 and one or more electric motor(s) 62. The HCM 60 may be part of the ECM 40 or may be a stand alone control module, as shown. The HCM 60 controls operation of the electric motor(s) 62. The electric motor(s) 62 may supplement and/or replace power output of the engine 14. The electric motor(s) 62 may be used to adjust speed of the engine 14 (i.e. rotating speed of a crankshaft 66 of the engine 14).

The catalyst heating system 12 may operate in an EHC heating mode, a fuel enrichment mode, and a SAI mode (collectively referred to as catalyst heating modes). The catalyst heating system 12 may operate in these modes when the engine 14 is activated. The catalyst heating mode includes activating the catalyst heating circuit 44 to heat the EHC 48. The ECM 40 controls current and voltage supplied to the terminals 52, 54 and heating time of the EHC 48 during the catalyst heating mode.

The fuel enrichment mode refers to when, for example, fuel flow rate is increased and/or air flow rate is decreases such that an air/fuel ratio of the engine 14 is decreased. Put another way, fuel enrichment includes operating the engine 14 in a richer during a current state than during a previous operating state. For example, the engine 14 may be operated at a stoichiometric ratio (14.7:1) in a current state. The engine 14 may be operated with an air/fuel ratio that is richer or less than the stoichiometric ratio during the fuel enrichment state.

The SAI mode includes activating the air pump 46 to inject ambient air into the exhaust system 16. The ambient air is injected into the exhaust system 16 upstream from the CC 18.

The catalyst heating system 12 may operate in one or more of the catalyst heating modes during the same period. For example, the catalyst heating system 12 may operate the fuel enrichment mode and the SAI mode during the same period to increase temperature of the non-EHC 50. During the EHC heating mode, the engine 14 may be operated in the fuel enrichment mode and the air pump 46 may be activated to increase combustion of exhaust gases within the exhaust system 16 and/or the CC 18 and thus increase temperature of the non-EHC 50.

The engine system 10 and/or the catalyst heating system 12 may initiate fuel enrichment and/or secondary air injection (SAI) upon activation of the engine 14 or when catalysts of the CC 18 are greater than or equal to the catalyst light off temperature $T_{CLO}$. This may be based on an engine coolant temperature and an intake valve temperature. As an alternative, the engine system 10 and/or the catalyst heating system 12 may initiate fuel enrichment and/or secondary air injection (SAI) as described below.

The ECM 40 and/or HCM 60 may control operation of the electric motor(s) 62. The electric motor(s) 62 may be connected to the engine 14 via a belt/pulley system, via a transmission, one or more clutches, and/or via other mechanical connecting devices. The electric motor(s) 62 may supplement and/or replace power output of the engine 14. The electric motor(s) 62 may be used to adjust speed of the engine 14 (i.e. rotating speed of a crankshaft 66 of the engine 14).

The ECM 40 controls the engine 14, the catalyst heating system 12, and the air pump 46 based on sensor information. The sensor information may be obtained directly via sensors and/or indirectly via algorithms and tables stored in memory 70. Some example sensors 80 for determining exhaust flow levels, exhaust temperature levels, exhaust pressure levels, catalyst temperatures, oxygen levels, intake air flow rates, intake air pressure, intake air temperature, vehicle speed, engine speed, EGR, etc are shown. Exhaust flow sensors 82, exhaust temperature sensors 83, exhaust pressure sensors 85, catalyst temperature sensors 86, an oxygen sensor 88, an EGR sensor 90, an intake air flow sensor 92, an intake air pressure sensor 94, an intake air temperature sensor 96, vehicle speed sensor 98 and an engine speed sensor 99 are shown.

A first exhaust flow, pressure and/or temperature sensor 100 may be connected to a first exhaust conduit 101 and upstream from the CC 18. A second exhaust flow, pressure and/or temperature sensor 102 may be connected to a second exhaust conduit 103 downstream from the CC 18. Catalyst temperature sensors 104, 105, 106 may be connected to the CC 44 and detect, for example, zone temperatures of the non-EHC 50.

The non-EHC 50 may include any number of zones and corresponding temperature sensors. As an example, the non- EHC 50 as shown includes 3 zones 107, 108, 109. Temperatures of each of the zones 107, 108, 109 may be directly detected via respective sensors and/or may be estimated, as described below. The ECM 40 may control operation of the engine 14 and the catalyst heating system 12 based on the information from the sensors 80, the first and second exhaust sensors 100, 102 and the catalyst temperature sensors 107, 108, 109.

Figure 2:
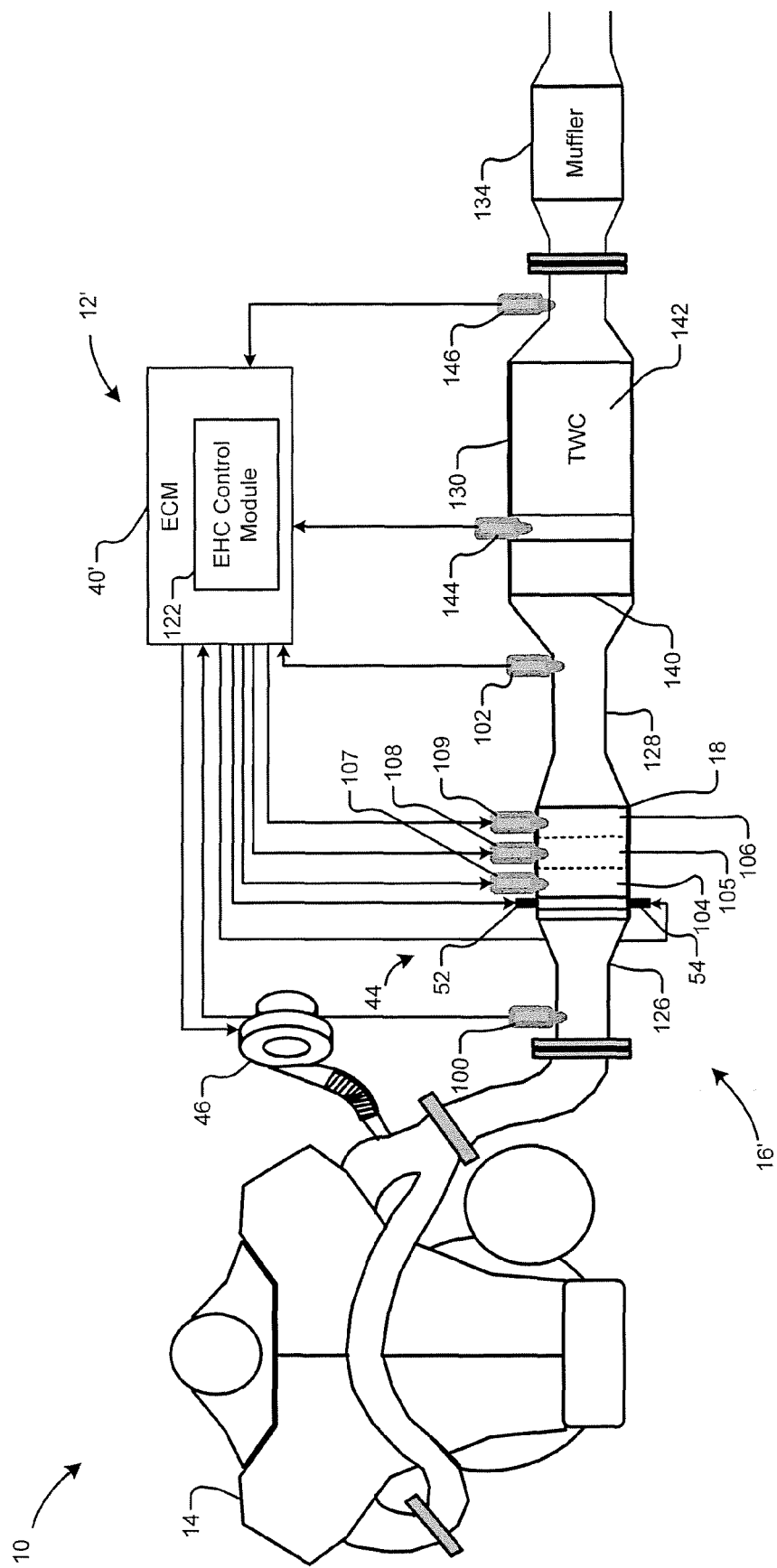
FIG. 2 is a functional block diagram of another engine system and corresponding catalyst heating system in accordance with the present disclosure.

In FIG. 2, a functional block diagram of another engine system 10' is shown. The engine system 10' may be part of the engine system 10. The engine system 10' includes the engine 14, a catalyst heating system 12', an exhaust system 16', and an ECM 40'. The engine 14' may be, for example, a spark ignition or diesel engine. The ECM 40' may include an EHC control module 122. The EHC control module 122 controls operation of the catalyst heating system 12'. In the example shown, the exhaust system 16' includes in the following order: an exhaust manifold 42', a first exhaust conduit 126, the CC 18, a second exhaust conduit 128, a catalyst assembly 130, a third exhaust conduit 132, and a muffler 134.

The catalyst heating system 12' includes the engine 14, the CC 18, the catalyst heating circuit 44, the air pump 46, and/or the EHC control module 122. The CC 18 includes the EHC 48 and the non-EHC 50. The catalyst heating circuit 44 may include the terminals 52, 54. The catalyst heating system 12' may also include the sensors 100, 102, 107, 108, 109.

The exhaust system 16' may further include the engine 14 and a catalyst assembly 130. The catalyst assembly 130 may include a first catalyst 140 and a second catalyst 142, which may be three-way catalysts. The catalysts 140, 142 oxide CO remaining in the exhaust received from the CC 18 to generate $CO_2$. The catalysts 140, 142 may also reduce nitrogen oxides NOx and oxidize unburnt hydrocarbons (HC) and volatile organic compounds.

The EHC module 122 may control operation of the engine 14 based on information from, for example, the second flow, pressure and/or temperature exhaust sensor 102 and/or from a third flow, pressure and/or temperature exhaust sensor 144 and a fourth flow, pressure and/or temperature exhaust sensor 146. The EHC control module may control engine operation during the fuel enrichment and SAI modes based on this information. The second exhaust sensor 102 is connected upstream from the catalyst assembly 130, on the second exhaust conduit 128, and between the CC 18 and the catalyst assembly 130. The third exhaust sensor 144 is connected to the catalyst assembly 130. The fourth exhaust sensor 146 is connected to the third exhaust conduit 132 and downstream of the catalyst assembly 130.

Figure 3:
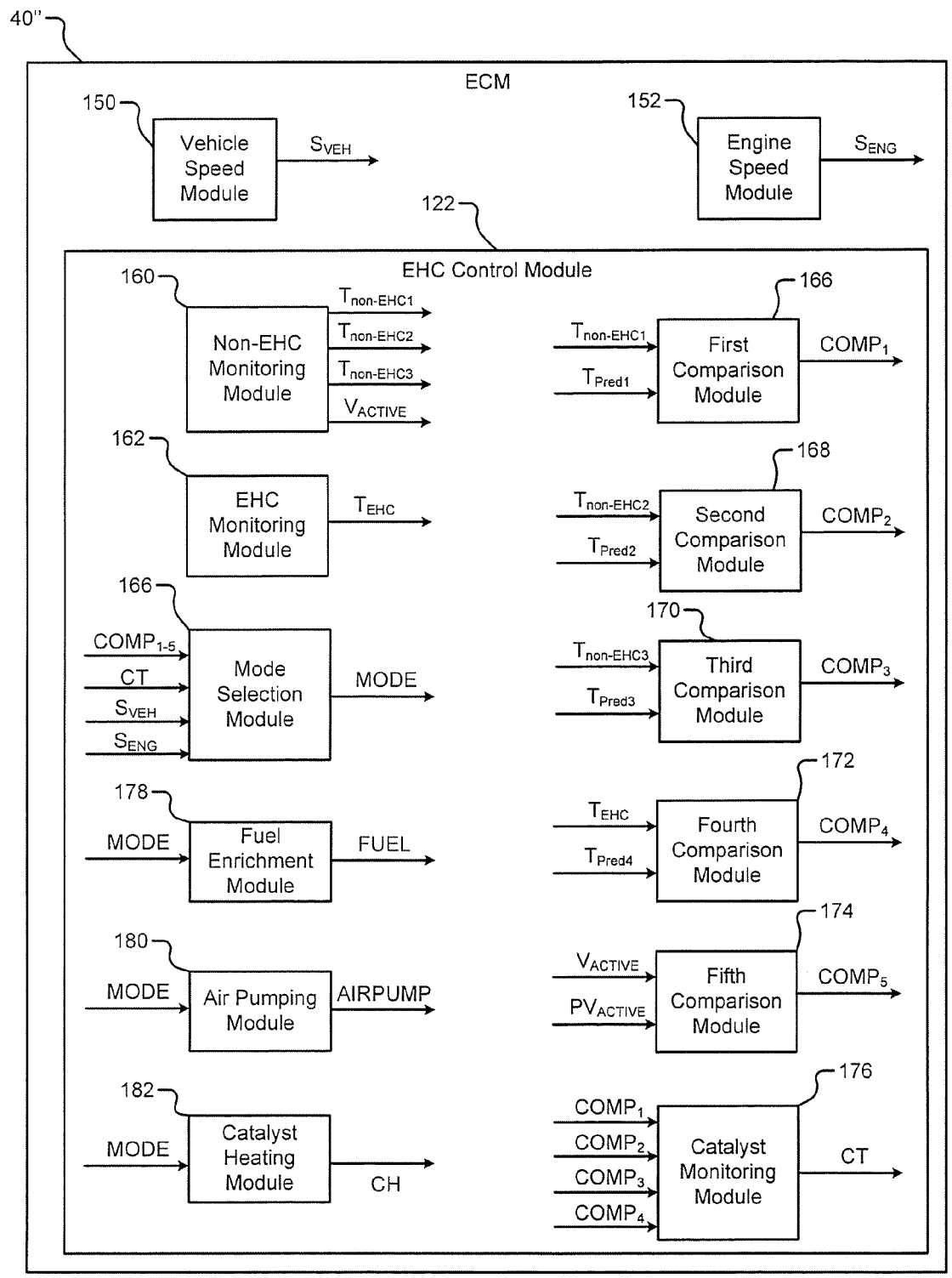
FIG. 3 is a functional block diagram of an engine control module in accordance with the present disclosure.

Referring now also to FIG. 3, a functional block diagram of an ECM 40'' is shown. The ECM 40'' may be used in the catalyst heating systems 12, 12' of FIGS. 1 and 2. The ECM 40'' includes the EHC control module 122 and may further include a vehicle speed module 150 and an engine speed module 152. The EHC control module 122 may control operation of the engine 14, the catalyst heating circuit 44, and the air pump 46. The vehicle speed module 150 determines speed of a vehicle based on information from, for example, the vehicle speed sensor 98. The engine speed module 152 determines speed of the engine 14 based on information from, for example, the engine speed sensor 99.

The EHC control module 122 includes a non-EHC monitoring module (first monitoring module) 160, a EHC monitoring module (second monitoring module) 162, a mode selection module 164, comparison modules 166-174, a catalyst monitoring module 176, a fuel injection module 178, an SAI module 180, and a catalyst heating module 182. The EHC control module 122 operates in the catalyst heating mode, the fuel enrichment mode and the SAI mode, which are selected by the mode selection module 164. The EHC control module 122 may operate in one or more or all of the modes during the same period.

Figure 4:
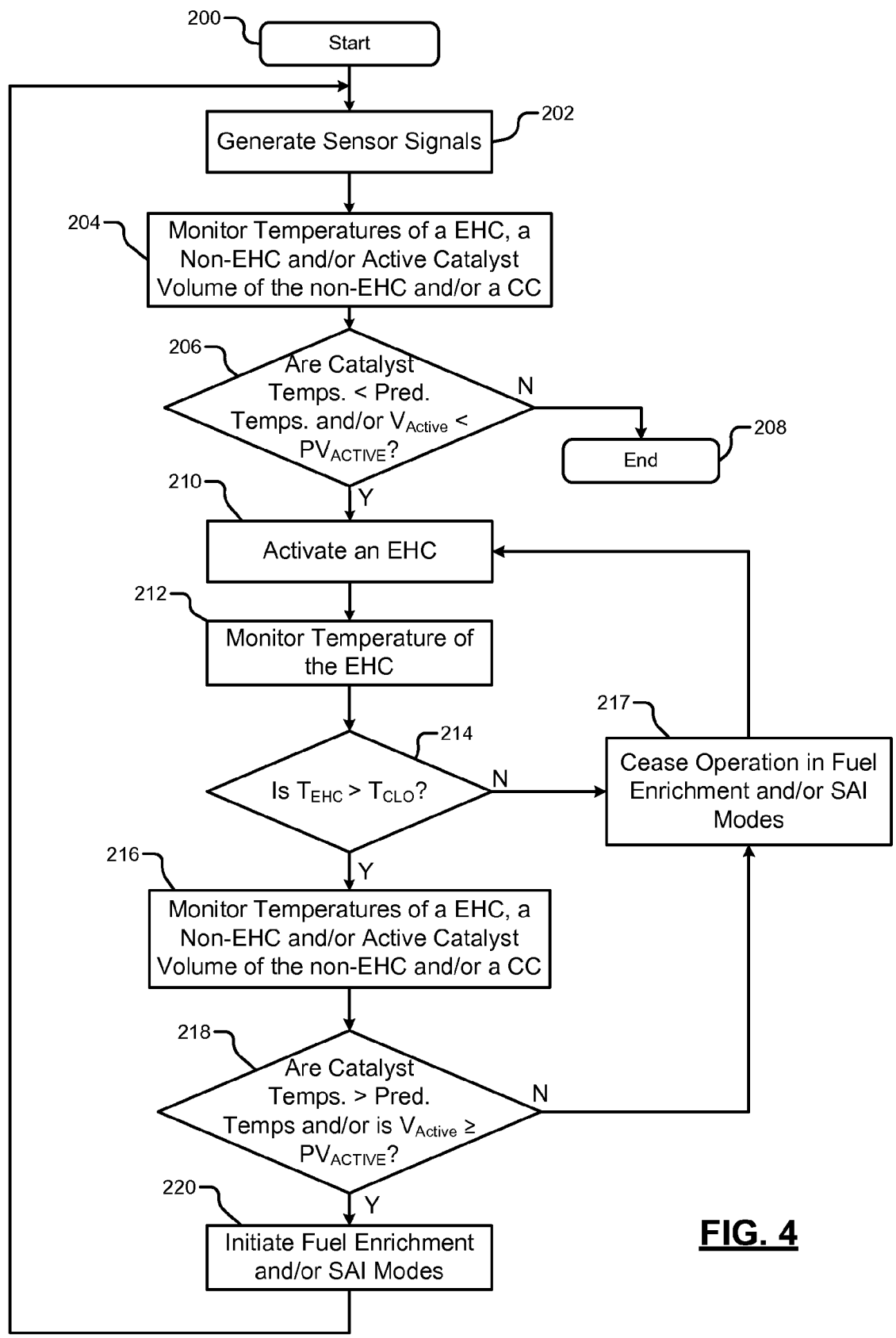
FIG. 4 illustrates a method of operating a catalyst heating system in accordance with the present disclosure.

Referring now also to FIG. 4, a method of operating a catalyst heating system is shown. Although the method is described with respect to the embodiments of FIGS. 1-3, the method may be applied to other embodiments of the present disclosure. The method may begin at 200. Below-described tasks 202-220 may be iteratively performed and may be performed by one of the ECMs 40, 40', 40'' of FIGS. 1-3.

At 202, sensor signals are generated. The sensor signals may include exhaust flow signals, exhaust temperature signals, exhaust pressure signals, catalyst temperature signals, an oxygen signal, an intake air flow signal, an intake air pressure signal, an intake air temperature signal, a vehicle speed signal, an engine speed signal, an EGR signal, etc., which may be generated by the above-described sensors 80 and 100-102, 107-109, 144, 146 of FIGS. 1 and 2.

At 204, the first monitoring module 160 monitors temperature(s) of the non-EHC 50 and/or an active catalyst volume of the non-EHC 50 and/or the CC 18 and generates temperature signals and/or a first active volume signal $V_{ACTIVE1}$. In one embodiment, the first monitoring module is monitoring temperatures of the zones 104-106 of the non-EHC 150. The temperatures may be determined based on the temperature signals from the sensors 107-109 and/or based on temperature estimations using equations such as equation 1. The first active volume signal $V_{ACTIVE1}$ may be estimated using, for example, equation 2 and may be based on the temperature signals from the sensors 107-109 and/or generated by the first monitoring module 160.

$$T_{non\text{-}EHC} = f\left\{ \begin{array}{l} F_{Rate}, S_{ENG}, C_{Mass}, C_{IMP}, T_{EHC}, DC, \\ EHC_{ActTime}, EHC_{Current}, EHC_{Volt}, T_{AMB}, CAM, SPK \end{array} \right\} \quad (1)$$

$$V_{ACTIVE} = f\left\{ \begin{array}{l} T_{non\text{-}EHC}, F_{Rate}, S_{ENG}, C_{Mass}, C_{IMP}, T_{EHC}, DC, \\ EHC_{ActTime}, EHC_{Current}, EHC_{Volt}, T_{AMB}, CAM, SPK \end{array} \right\} \quad (2)$$

$F_{Rate}$ is exhaust flow rate through the CC 18, which may be a function of mass air flow and fuel quantity supplied to the cylinders 28. The mass air flow may be determined by a mass air flow sensor, such as the intake air flow sensor 92. $S_{ENG}$ is speed of the engine 14 (i.e. rotational speed of the crankshaft 66). DC is duty cycle of the engine. $C_{Mass}$ is mass of the EHC 48 and/or the non-EHC 50 or total mass of the catalysts of the CC 18. $C_{Imp}$ is resistance or impedance of the EHC 48. $EHC_{ActTime}$ is time that the catalyst heating system 12 is activated. $EHC_{Current}$ is current level applied to the EHC 48. $EHC_{Volt}$ is voltage applied to the EHC 48. $T_{amb}$ is ambient temperature. CAM is cam phasing of the engine 14. SPK is spark timing.

As an example, the first monitoring module 160 may generate temperature signals $T_{non\text{-}EHC1A}$, $T_{non\text{-}EHC2A}$, $T_{non\text{-}EHC3A}$ associated with each of the zones 104-106, as shown. The first active volume signal $V_{ACTIVE1}$ may be generated by the first monitoring module 160 or by a dedicated active catalyst volume monitoring module.

In addition, the second monitoring module may monitor temperature of the EHC 48 and generate a first EHC temperature signal $T_{EHC1}$. The temperature of the EHC 48 may be determined directly via an EHC temperature sensor and/or indirectly using, for example, equation 3.

$$T_{EHC} = f \begin{Bmatrix} F_{Rate}, S_{ENG}, C_{Mass}, C_{IMP}, DC, \\ EHC_{ActTime}, EHC_{Current}, EHC_{Volt}, T_{AMB}, CAM, SPK \end{Bmatrix} \quad (1)$$

The temperature signals $T_{non-EHC1A}$, $T_{non-EHC2A}$, $T_{non-EHC3A}$, $T_{EHC1}$ and the first active volume signal $V_{ACTIVE1}$ may be based on one or more of the engine system parameters provided in equations 1-3 and/or other engine system parameters, such as mass of the EHC 48 $EHC_{Mass}$.

At 206, the comparison modules 166-170 compare the temperature signals $T_{non-EHC1A}$, $T_{non-EHC2A}$, $T_{non-EHC3A}$ to a catalyst light off temperature $T_{CLO}$ and/or to respective predetermined temperatures $T_{Pred1}$, $T_{Pred2}$, $T_{Pred3}$. The catalyst light off temperature $T_{CLO}$ may be, for example, between 200-400° C. In one embodiment, the CLO temperature $T_{CLO}$ is approximately 350° C.

In one embodiment, the first predetermined temperature $T_{Pred1}$ is greater than the second predetermined temperature $T_{Pred2}$, which may be greater than the third predetermined temperature $T_{Pred3}$. For example only, the first predetermined temperature $T_{Pred1}$ may be equal to approximately 600-700° C., the second predetermined temperature $T_{Pred2}$ may be equal to approximately 500-600° C., the third predetermined temperature $T_{Pred3}$ may be equal to approximately 400-500° C.

The first comparison module 166 generates a first comparison signal $COMP_1$ based on a comparison between the first temperature signal $T_{non-EHC1}$ and the first predetermined temperature $T_{Pred1}$. The second comparison module 168 generates a second comparison signal $COMP_2$ based on a comparison between the second temperature signal $T_{non-EHC2}$ and the second predetermined temperature $T_{Pred2}$. The third comparison module 170 generates a third comparison signal $COMP_3$ based on a comparison between the third temperature signal $T_{non-EHC3}$ and the third predetermined temperature $T_{Pred3}$.

At 206, the temperature of the EHC 48 or the first EHC temperature signal $T_{EHC1}$ may also be compared with the catalyst light off temperature $T_{CLO}$ and/or a fourth predetermined temperature $T_{Pred4}$ (e.g., 700° C.). The fourth predetermined temperature $T_{Pred4}$ may be greater than or equal to the first predetermined temperature $T_{Pred1}$. The fourth comparison module generates a fourth comparison signal $COMP_4$ based on the temperature of the EHC 48, the catalyst light off temperature $T_{CLO}$, and/or the fourth predetermined temperature $T_{Pred4}$.

The fifth comparison module 174 compares the first active volume signal $V_{ACTIVE1}$ to a predetermined active volume $PV_{ACTIVE}$ and generates a fifth comparison signal $COMP_5$. The predetermined active volume $PV_{ACTIVE}$ refers to a target catalyst volume of the non-EHC 50 and/or the CC 18 that is at a temperature that is greater than or equal to an active catalyst temperature (temperature at which the catalyst is functioning and reducing emissions or the catalyst light off temperature). As an example, the target catalyst volume may be approximately 30-40% of the non-EHC 50 and/or the 30-40% of the total catalyst volume of the CC 18.

The catalyst monitoring module 176 may receive the comparison signals $COMP_1$, $COMP_2$, $COMP_3$, $COMP_4$ and generate a catalyst temperature summary signal CT. For example only, the catalyst monitoring module 176 may perform as and/or include an AND gate. In one embodiment, output of the catalyst monitoring module 176 is HIGH when all of the comparison signals $COMP_1$, $COMP_2$, $COMP_3$, $COMP_4$ are HIGH.

Control may end at 208 when: one or more of the temperature signals $T_{non-EHC1A}$, $T_{non-EHC2A}$, $T_{non-EHC3A}$, are not less than the catalyst light off temperature $T_{CLO}$ and/or corresponding predetermined temperatures $T_{Pred1}$, $T_{Pred2}$, $T_{Pred3}$; the first EHC temperature signal $T_{EHC1}$ is not less than the catalyst light off temperature $T_{CLO}$ and/or the fourth predetermined temperature $T_{Pred4}$; the catalyst temperature summary signal is HIGH; and/or the first active volume signal $V_{ACTIVE1}$ is not less than the predetermined active volume $PV_{ACTIVE}$, otherwise control may proceed to 210. As an alternative to ending at 208, control may return to 202.

At 210, the mode selection module 164 selects the EHC catalyst heating mode and generates a mode selection signal MODE based on one or more of the signals $COMP_1$, $COMP_2$, $COMP_3$, $COMP_4$, $COMP_5$, CT. The catalyst heating circuit 44 is activated to heat the EHC 48 during the EHC catalyst heating mode. The catalyst heating module 182 generates a catalyst heating signal CH based on the mode selection signal MODE.

The catalyst heating signal CH may indicate a selected current and/or voltage to apply to terminals of the catalyst heating system 12. The EHC catalyst heating mode may be selected based on the engine speed $S_{ENG}$ and/or a vehicle speed $S_{VEH}$. As an example, catalyst heating mode may be selected when the engine speed is greater than a predetermined engine speed. As another example, EHC catalyst heating mode may be selected when the engine speed is greater than approximately 0 revolutions-per-minute (RPM).

At 212, the second monitoring module 162 monitors temperature of the EHC 48 and generates a second EHC temperature signal $T_{EHC2}$. The second temperature signal $T_{EHC2}$ may be determined directly from an EHC temperature sensor and/or indirectly estimated, for example, using equation 3.

At 214, the fourth comparison module 172 compares the second EHC temperature signal $T_{EHC2}$ to the catalyst light off temperature $T_{CLO}$. Control proceeds to 216 when the second EHC temperature signal $T_{EHC2}$ is greater than the catalyst light off temperature $T_{CLO}$, otherwise control may proceed to 217.

At 216, the non-EHC monitoring module 160 and the EHC monitoring module 162 monitor the temperatures of the EHC 48 and the non-EHC 50, as at 204. The monitoring modules 160 and 162 may generate respective EHC and non-EHC temperatures signals $T_{EHC3}$, $T_{non-EHC1B}$, $T_{non-EHC2B}$, $T_{non-EHC3B}$. The non-EHC monitoring module 160 may also monitor active catalyst volume of the non-EHC 50 and/or the CC 18 and generate a second active catalyst volume signal $V_{ACTIVE2}$.

At 217 and if currently enabled (if currently selected and active), the mode selection module 164 may disable the fuel enrichment mode and/or the SAI mode. Control may return to 210 after 217.

At 218, the comparison modules 166-170 and 174 compare one or more of the non-EHC temperatures signals $T_{non-EHC1B}$, $T_{non-EHC2B}$, $T_{non-EHC3B}$ and the second active catalyst volume signal $V_{ACTIVE2}$ to the predetermined temperatures $T_{Pred1}$, $T_{Pred2}$, $T_{Pred3}$ and predetermined volume $PV_{ACTIVE}$. The comparisons may be performed as at 206 and to generate corresponding comparison signals.

Control may proceed to 220 when: one or more of the temperature signals $T_{non-EHC1B}$, $T_{non-EHC2B}$, $T_{non-EHC3B}$, are greater than the corresponding predetermined temperatures $T_{Pred1}$, $T_{Pred2}$, $T_{Pred3}$; the catalyst temperature summary signal is HIGH; and/or the second active volume signal $V_{ACTIVE2}$ is greater than or equal to the predetermined active volume $PV_{ACTIVE}$, otherwise control may proceed to 217.

Tasks 210-218 allow the EHC 48 and/or the non-EHC 50 to increase in temperature to predetermined temperatures before activation of the fuel enrichment and SAI modes. As an example, the task 222 may be performed after the downstream most zone (e.g., zone 106) of the non-EHC 50 is 300-400° C. This prevents, for example, the SAI from cooling the EHC 48 before the non-EHC 50 is at a temperature that is greater than the catalyst light off temperature $T_{CLO}$ and/or the active catalyst volume is greater than or equal to the predetermined active volume $PV_{ACTIVE}$.

At 220, the mode selection module 164 selects the fuel enrichment mode and/or the SAI mode and generates the mode selection signal MODE to initiate the selected modes. Fuel enrichment and SAI may be performed based on statuses of the EHC 48 and/or the non-EHC 50. The fuel enrichment and the SAI may be performed, for example, based on temperatures of the EHC 48 and zones of the non-EHC 50. As another example, fuel enrichment and SAI may be performed based on the active catalyst volume of the non-EHC 50 and/or the CC 18.

The fuel enrichment module 178 may generate a fuel injection signal FUEL based on the mode selection signal MODE, status and/or temperatures of the catalysts and zones of the CC 18, and/or active catalyst volume of the CC 18. The air pumping module 180 may generate an air pump signal AIRPUMP based on the mode selection signal MODE, status and/or temperatures of the catalysts and zones of the CC 18, and/or active catalyst volume of the CC 18. The air pump signal activates the air pump 46. Control may return to 202 after 220.

The fuel enrichment mode and/or the SAI mode may remain active until, for example, the downstream most zone of the non-EHC 50 (e.g., zone 106) is at a temperature greater than a predetermined temperature. The predetermined temperature may be the catalyst light off temperature $T_{CLO}$ and/or a greater temperature, such as 600-700° C.

The above-described method may end during any of tasks 202-220 when, for example, the engine 14 is deactivated. Deactivation of the engine 14 may include deactivating spark and fuel of the engine 14 and deactivating the air pump 46. The above-described tasks performed at 202-220 are meant to be illustrative examples; the tasks may be performed sequentially, synchronously, simultaneously, continuously, during overlapping time periods or in a different order depending upon the application. The above-described tasks are performed to heat and maintain temperature of catalysts of a catalyst assembly at or greater than a catalyst light off temperature.

Operation in the fuel enrichment mode and in the SAI mode as described in the above-described method minimizes cooling of the non-EHC 50. The described method minimizes hydrocarbon slips due to catalyst cooling. Hydrocarbon slips refer to periods when the CC 18 is unable to maintain oxidation performance levels because portions of the catalysts of the CC 18 are inactive. The above-described method also eliminates inefficient fuel use during catalyst heating modes, as fuel enrichment is performed based on temperatures of the catalysts of the CC 18. The above-described embodiments provide synergy between an EHC, a SAI system and a fuel enrichment system based on active catalyst volumes to reduce hydrocarbon emission.

The above-described embodiments allow for quick heating of a catalyst. As a result, catalysts of an exhaust system are heated and/or are active (total catalyst heated volume is increased) quickly after starting an engine. The above-described embodiments reduce emission output of the engine by quickly heating and maintaining temperature of catalysts after activation of an engine.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A catalyst heating system comprising:
   a first electronic circuit configured to receive a first signal from a first sensor and a second signal from a second sensor, wherein the first signal is indicative of a first temperature of a first catalyst in a catalytic converter of a catalyst assembly in an exhaust system of an engine, wherein the second signal is indicative of a second temperature of a second catalyst in the catalytic converter, wherein the first catalyst is an electrically heated catalyst (EHC), and wherein the second catalyst is not electrically heated and is downstream from the first catalyst;
   a second electronic circuit configured to select operation in a plurality of modes including selecting operation in an EHC heating mode, a fuel enrichment mode, and a secondary air injection mode based on the first temperature and the second temperature; and
   a third electronic circuit configured to (i) control current to the first catalyst based on the selected plurality of modes, (ii) operate in the EHC heating mode in response to the first temperature being less than a first predetermined temperature and the second temperature being less than a second predetermined temperature, (iii) refrain from operating in the secondary air injection mode while the first temperature is greater than a catalyst light off temperature and the second temperature is less than the second predetermined temperature to prevent additional air flow generated during the secondary air injection mode from cooling down the second catalyst, and (iv) in response to the second temperature of the second catalyst being greater than the second predetermined temperature, operating in the fuel enrichment mode while operating in the secondary air injection mode to increase the second temperature to a third predetermined temperature.

2. The catalyst heating system of claim 1, wherein the second electronic circuit is configured to initiate operation in the selected plurality of modes when the engine is activated.

3. The catalyst heating system of claim 1, wherein:
   the first catalyst is an EHC;
   the second catalyst is a non-EHC; and
   the second catalyst is downstream from the first catalyst.

4. The catalyst heating system of claim 1, wherein:
   the second electronic circuit is configured to initiate the fuel enrichment mode and the secondary air injection mode in response to the first temperature of the first catalyst being greater than or equal to the first predetermined temperature; and
   the first predetermined temperature is greater than the catalyst light off temperature.

5. The catalyst heating system of claim 4, wherein:
   the second electronic circuit is configured to cease operation in the fuel enrichment mode and the secondary air injection mode in response to the first temperature of the first catalyst being less than or equal to the catalyst light off temperature; and wherein the second catalyst is a downstream most zone of the catalyst assembly.

6. The catalyst heating system of claim 1, wherein:
the first electronic circuit is configured to monitor a fourth temperature of a third catalyst of the catalyst assembly;
the third electronic circuit operates in the EHC heating mode to supply the current to the first catalyst to electrically heat the first catalyst during the EHC heating mode;
the second catalyst and the third catalyst are downstream from the first catalyst and are not electrically heated during the EHC heating mode; and
the second electronic circuit is configured to select operation in the EMC heating mode, the fuel enrichment mode, and the secondary air injection mode based on the first temperature, the second temperature, and the fourth temperature.

7. The catalyst heating system of claim 6, further comprising a plurality of temperature sensors that generate temperature signals indicating the first temperature of the first catalyst, the second temperature of the second catalyst, and the third temperature of the third catalyst, wherein:
the first electronic circuit is configured to estimate an active catalyst volume of the catalyst assembly based on the first temperature of the first catalyst, the second temperature of the second catalyst, and the third temperature of the third catalyst; and
the second electronic circuit is configured to initiate the fuel enrichment mode and the secondary air injection mode based on the active catalyst volume.

8. The catalyst heating system of claim 1, further comprising:
a fourth electronic circuit configured to adjust fuel injection of the engine based on the first temperature of the first catalyst and the second temperature of the second catalyst during the fuel enrichment mode; and
a fifth electronic circuit configured to adjust air injection into the exhaust system based on the first temperature of the first catalyst and the second temperature of the second catalyst during the secondary air injection mode.

9. The catalyst heating system of claim 8, wherein each of the first electronic circuit, the second electronic circuit, the third electronic circuit, the fourth electronic circuit, and the fifth electronic circuit includes at least one of an electronic circuit, an application specific integrated circuit, a processor, memory, and a combinational logic circuit.

10. The catalyst heating system of claim 1, wherein the first electronic circuit is a same electronic circuit as at least one of the second electronic circuit and the third electronic circuit.

11. The catalyst heating system of claim 1, wherein:
the second catalyst comprises a first zone, a second zone, and a third zone;
the first zone is downstream from the first catalyst;
the second zone is downstream from the first zone;
the third zone is downstream from the second zone; and
the second temperature is of the third zone.

12. The catalyst heating system of claim 11, wherein:
the first electronic circuit is configured to monitor (i) a temperature of the first zone, and (ii) a temperature of the second zone;
the third electronic circuit is configured to refrain from operating in the fuel enrichment mode and the secondary air injection mode while (i) the temperature of the first zone is less than a fourth predetermined temperature, (ii) the temperature of the second zone is less than a fifth predetermined temperature, and (iii) the second temperature is less than the second predetermined temperature;
the third electronic circuit is configured to operate in the fuel enrichment mode and the secondary air injection mode while (i) the temperature of the first zone is greater than the fourth predetermined temperature, (ii) the temperature of the second zone is greater than the fifth predetermined temperature, and (iii) the second temperature is greater than the second predetermined temperature;
the fourth predetermined temperature is less than the first predetermined temperature;
the fifth predetermined temperature is less than the fourth predetermined temperature; and
the second predetermined temperature is less than the fifth predetermined temperature.

13. The catalyst heating system of claim 1, wherein the third temperature is greater than the catalyst light off temperature.

14. The catalyst heating system of claim 1, further comprising the catalyst assembly, wherein the catalyst assembly comprises:
the first catalyst; and
the second catalyst,
wherein the third electronic circuit is configured to transfer heat from the first catalyst to the second catalyst by initiating the fuel enrichment mode and the secondary air injection mode.

15. A method of operating a catalyst heating system comprising:
receiving a first signal from a first sensor and a second signal from a second sensor, wherein the first signal is indicative of a first temperature of a first catalyst in a catalytic converter of a catalyst assembly in an exhaust system of an engine, wherein the second signal is indicative of a second temperature of a second catalyst in the catalytic converter, wherein the first catalyst is an electrically heated catalyst (EHC), and wherein the second catalyst is not electrically heated and is downstream from the first catalyst;
selecting operation in plurality of modes including selecting operation in an EHC heating mode, a fuel enrichment mode, and a secondary air injection mode based on the first temperature of the first catalyst and the second temperature of the second catalyst;
controlling current to the first catalyst based on the selected plurality of modes;
operating in the EHC heating mode in response to the first temperature of the first catalyst being less than a first predetermined temperature and the second temperature of the second catalyst being less than a second predetermined temperature;
refraining from operating in the secondary air injection mode while the first temperature is greater than a catalyst light off temperature and the second temperature is less than the second predetermined temperature to prevent additional air flow generated during the secondary air injection mode from cooling down the second catalyst; and
in response to the second temperature being greater than the second predetermined temperature, operating in the fuel enrichment mode while operating in the secondary air injection mode to increase the second temperature to a third predetermined temperature.

16. The method of claim 15, wherein:

the fuel enrichment mode and the secondary air injection mode are selected based on the first temperature of the first catalyst being greater than the first predetermined temperature; and the first predetermined temperature is greater than the catalyst light off temperature.

17. The method of claim 15, further comprising:

initiating the fuel enrichment mode and the secondary air injection mode in response to the first temperature of the first catalyst being greater than or equal to the catalyst light off temperature; and ceasing operation in the fuel enrichment mode and the secondary air injection mode in response to the first temperature of the first catalyst being greater than the catalyst light off temperature and the second temperature of the second catalyst being less than the second predetermined temperature.

18. The method of claim 15, further comprising:

adjusting fuel injection of the engine based on the first temperature of the first catalyst and the second temperature of the second catalyst during the fuel enrichment mode; and adjusting air injection into the exhaust system based on the first temperature of the first catalyst and the second temperature of the second catalyst during the secondary air injection mode.

19. The method of claim 15, wherein:

the second catalyst comprises a first zone, a second zone, and a third zone;

the first zone is downstream from the first catalyst;

the second zone is downstream from the first zone;

the third zone is downstream from the second zone;

the second temperature is of the third zone;

monitoring (i) a temperature of the first zone, and (ii) a temperature of the second zone;

refraining from operating in the fuel enrichment mode and the secondary air injection mode while (i) the temperature of the first zone is less than a fourth predetermined temperature, (ii) the temperature of the second zone is less than a fifth predetermined temperature, and (iii) the second temperature is less than the second predetermined temperature; and operating in the fuel enrichment mode and the secondary air injection mode while (i) the temperature of the first zone is greater than the fourth predetermined temperature, (ii) the temperature of the second zone is greater than the fifth predetermined temperature, and (iii) the second temperature is greater than the second predetermined temperature.

* * * * *